United States Patent
Blunk et al.

(10) Patent No.: US 6,811,918 B2
(45) Date of Patent: Nov. 2, 2004

(54) LOW CONTACT RESISTANCE PEM FUEL CELL

(75) Inventors: Richard H. Blunk, Macomb Township, Macomb County, MI (US); Mahmoud H. Abd Elhamid, Warren, MI (US); Daniel John Lisi, Eastpointe, MI (US); Youssef Morcos Mikhail, Sterling Heights, MI (US)

(73) Assignee: General Motors Corporation, Detroit, MI (US)

(*) Notice: Subject to any disclaimer, the term of this patent is extended or adjusted under 35 U.S.C. 154(b) by 114 days.

(21) Appl. No.: 09/997,190

(22) Filed: Nov. 20, 2001

(65) Prior Publication Data

US 2003/0096151 A1 May 22, 2003

(51) Int. Cl.[7] .................................................. H01M 4/96
(52) U.S. Cl. ............................. 429/40; 429/12; 429/13; 429/32
(58) Field of Search .............................. 429/12, 13, 32, 429/40, 34, 37

(56) References Cited

U.S. PATENT DOCUMENTS

| | | | |
|---|---|---|---|
| 5,272,017 A | 12/1993 | Swathirajan et al. | 429/33 |
| RE37,284 E | 7/2001 | Li et al. | 429/32 |
| 6,372,376 B1 * | 4/2002 | Fronk et al. | 429/41 |
| 6,379,795 B1 * | 4/2002 | Bisaria et al. | 428/378 |
| 6,562,507 B1 * | 5/2003 | Cisar et al. | 429/40 |
| 2002/0039675 A1 * | 4/2002 | Braun et al. | 429/34 |

OTHER PUBLICATIONS

Mrowec et al., "Gas Corrosion of Metals", National Technical Information Service, Springfield, VA, pp. 22–23 (1975).*

U.S. Ser. No. 09/456,478, filed Dec. 1999, Fronk et al, "Corrosion Resistant PEM Fuel Cell".

U.S. Ser. No. 09/871,189, filed May 2001, Blunk et al., Fuel Cell Separator Plate Having Controlled Fiber Orientation and Method of Manufacture.

* cited by examiner

Primary Examiner—Dah-Wei Yuan
(74) Attorney, Agent, or Firm—Carry W. Brooks (57) ABSTRACT

A PEM fuel cell having a current collector comprising a polymer composite and a diffusion media engaging said polymer composite. The polymer composite has a hyperconductive surface layer engaging the diffusion media to reduce the contact resistance therebetween. The hyperconductive surface layer is formed by depositing or smearing an electrically-conductive material on the surface of the polymer composite.

14 Claims, 5 Drawing Sheets

LOW CONTACT RESISTANCE PEM FUEL CELL

TECHNICAL FIELD

This invention relates to PEM fuel cells, and more particularly to electrical current collectors (e.g. bipolar plates) therefor that are made from polymer composite materials, and have low contact resistance with adjacent diffusion media.

BACKGROUND OF THE INVENTION

Fuel cells have been proposed as a power source for electric vehicles and other applications. One known fuel cell is the PEM (i.e., Proton Exchange Membrane) fuel cell that includes a so-called "membrane-electrode-assembly" (MEA) comprising a thin, solid polymer membrane-electrolyte having an anode on one face of the membrane-electrolyte and a cathode on the opposite face of the membrane-electrolyte. The anode and cathode typically comprise finely divided carbon particles, very finely divided catalytic particles supported on the carbon particles, and proton conductive material intermingled with the catalytic and carbon particles. One such membrane-electrode-assembly and fuel cell is described in U.S. Pat. No. 5,272,017 issued Dec. 21, 1993 and assigned to the assignee of the present invention. The membrane-electrode-assembly is sandwiched between a pair of electrically conductive current collectors for the anode and cathode, which current collectors typically contain a number of lands that define a plurality of channels or grooves for supplying the fuel cell's gaseous reactants (i.e., $H_2$ & $O_2$/air) to the surfaces of the respective anode and cathode.

Multi-cell PEM fuel cells comprise a plurality of the MEAs stacked together in electrical series and separated one from the next by a gas-impermeable, electrically-conductive current collector known as a bipolar plate. Such multi-cell fuel cells are known as fuel cell stacks. The bipolar plate has two working faces, one confronting the anode of one cell and the other confronting the cathode on the next adjacent cell in the stack, and electrically conducts current between the adjacent cells. Current collectors at the ends of the stack contact only the end cells and are known as end plates.

A highly porous (i.e. ca. 60%–80%), electrically-conductive material (e.g. cloth, screen, paper, foam, etc.) known as "diffusion media" is interposed between the current collectors and the MEA and serves (1) to distribute gaseous reactant over the entire face of the electrode, between and under the lands of the current collector, and (2) collects current from the face of the electrode confronting a groove, and conveys it to the adjacent lands that define that groove. One known such diffusion media comprises a graphite paper having a porosity of about 70% by volume, an uncompressed thickness of about 0.17 mm, and is commercially available from the Toray Company under the name Toray 060.

In an $H_2$—$O_2$/air PEM fuel cell environment, the current collectors are in constant contact with highly acidic solutions (pH 3–5) containing $F^-$, $SO_4^{--}$, $SO_3^-$, $HSO_4^-$, $CO_3^{--}$, and $HCO_3^-$, etc. Moreover, the cathode operates in a highly oxidizing environment, being polarized to a maximum of about +1 V (vs. the normal hydrogen electrode) while being exposed to pressurized air. Finally, the anode is constantly exposed to hydrogen. Hence, the current collectors must be resistant to a hostile environment in the fuel cell. Accordingly, current collectors have heretofore been either (1) machined from pieces of graphite, (2) molded from polymer composite materials comprising about 70% to about 90% % by volume electrically-conductive filler (e.g. graphite particles or filaments) dispersed throughout a polymeric matrix (thermoplastic or thermoset), or (3) fabricated from metals coated with polymer composite materials containing about 30% to about 40% by volume conductive particles. In this later regard, see co pending U.S. patent application, Fronk et al Ser. No. 09/456,478, filed Dec. 7, 1999 which (1) is assigned to the assignee of this invention, (2) is incorporated herein by reference, and (3) discloses current collectors made from metal sheets coated with a corrosion-resistant, electrically-conductive layer comprising a plurality of electrically conductive, corrosion-proof (i.e. oxidation-resistant and-acid resistant) filler particles dispersed throughout a matrix of an acid-resistant, water insoluble, oxidation-resistant polymer that binds the particles together and to the surface of the metal sheet. Fronk et al-type composite coatings will preferably have a resistivity no greater than about 50 ohm-cm and a thickness between about 5 microns and 75 microns depending on the composition, resistivity and integrity of the coating. The thinner coatings are preferred to achieve lower IR drop through the fuel cell stack.

Lightweight metals such as aluminum and their alloys have also been proposed for use in making fuel cell current collectors. Unfortunately, such metals are susceptible to dissolution in the hostile PEM fuel cell environment. Accordingly, it has been proposed to coat lightweight metal current collectors with a layer of metal or metal compound, which is both electrically conductive and corrosion resistant to thereby protect the underlying metal. See for example, Li et al RE 37,284E, issued Jul. 17, 2001, which is assigned to the assignee of the present invention, and discloses a lightweight metal core, a stainless steel passivating layer atop the core, and a layer of titanium nitride (TiN) atop the stainless steel layer.

SUMMARY OF THE INVENTION

The present invention relates to PEM fuel cells using current collectors made either entirely, or at least in part, from polymer composite materials such as described above. A high contact resistance exists between the diffusion media and current collectors made from such composite materials owing to the fact that the diffusion media is porous (ca. 60%–80% porosity) and the surface of the composite material engaging the diffusion media contains less than 70% (typically about 30% to about 40%) by volume of conductive filler (with the remainder being non-conductive polymer matrix material). Hence, current flow between the diffusion media and the composite material occurs only at sites where a conductive strand of the diffusion media contacts the conductive filler in the composite material. No current flows at sites (1) where a diffusion media strand meets the polymer matrix material of the composite, or (2) where a composite's conductive filler meets a pore in the diffusion media.

The present invention reduces the contact resistance between the diffusion media and composite-containing current collectors in PEM fuel cells. More specifically, the present invention is directed to a PEM fuel cell having at least one cell comprising (1) a pair of opposite polarity electrodes each having a first face exposed to a fuel cell reactant and a second face engaging a membrane-electrolyte interjacent said electrodes, (2) a porous, electrically-conductive diffusion media engaging the first face for distributing reactant over, and conducting electrical current from, the first face, and (3) a current collector (e.g. a bi-polar plate) engaging the diffusion media for conducting electrical current from the media. The current collector comprises a polymer composite that has a first electrical conductivity and comprises corrosion-proof electrically conductive filler dispersed throughout an oxidation-resistant and acid-resistant, water-insoluble polymeric matrix. The polymeric matrix may be either a thermoplastic or a thermoset material, and will preferably be selected from the group consisting of epoxies, polyamideimides, polyether-imides, polyphenols, fluro-elastomers, polyesters, phenoxy-phenolics, epoxide-phenolics, acrylics, and urethanes. The electrically conductive filler in the composite (1) are preferably selected from the group consisting of gold, platinum, graphite, conductive carbon, palladium, rhodium, ruthenium, and the rare earth metals, and (2) may take many physical forms (e.g. elongated filaments, or spheroidal, flake, fibrillose particles or aggregates of such particles Discrete fibrilose particles will preferably be oriented generally in the direction current flows through the current collector, such as described in copending U.S. patent application Blunk et al., U.S. Ser. No. 09/871,189 filed May 31, 2001, which is assigned to the assignee of the present invention and is incorporated herein by reference. The invention is particularly effective with current collectors made from composites having fillers comprising conductive filaments (e.g. graphite or carbon) extending through the thickness of the current collector (i.e. in the direction of current flow through the collector).

The invention comprehends an oxidation-resistant and acid-resistant surface layer that covers the composite component of the current collector and engages the diffusion media. The surface layer has a second electrical conductivity that is greater (hereafter hyperconductive) than the conductivity of the underlying polymer composite material, and may be a discrete layer adhering to the composite or an integral layer formed by embedding additional conductive particles in the surface of the composite, or smearing existing filler from the composite over the exterior surface of the composite. The hyperconductive surface preferably has a resistivity at least one order of magnitude less than the underlying composite, and most preferably, at least 100 times less than the underlying composite, and serves to reduce the contact resistance between the polymer composite material and the diffusion media by shunting electrical current passing through the media to the conductive particles in the polymer composite that reside at the interface between the surface layer and the composite. The invention is seen to be most beneficial at low (i.e. <150 psi) stack compression pressures, but is also effective at high (i.e. >200 psi) stack compression pressures, especially with polymer composites having conductive particle loadings less than about 70% by volume.

According to one embodiment of the invention, the entire current collector is made (e.g. molded) from the polymer composite material and then coated with the hyperconductive surface layer. In another embodiment, the current collector comprises a metal substrate (e.g. a stamped metal sheet) that underlies a layer of polymer composite material, which, in turn, is coated, with the hyperconductive surface layer of the present invention. In still another embodiment, the metal substrate comprises a first acid-soluble metal (e.g. aluminum) underlying a second acid-insoluble, oxidizeable metal (e.g. titanium or stainless steel), a polymer layer atop the second metal, and the hyperconductive layer of the present invention atop the polymer composite coating.

According to a preferred embodiment of the invention, the hyperconductive surface layer comprises a plurality of discrete, abutting, oxidation-resistant and acid-resistant, electrically-conductive particles (most preferably graphite) embedded in a surface of the composite so as to provide a higher concentration of conductive particles at the surface than throughout the remainder of the composite. Suitable alternative particles include gold, platinum, conductive carbon, palladium, rhodium, ruthenium, and the rare earth metals (i.e. the same particles as are used in the polymer composite). According to another embodiment, the hyperconductive surface layer comprises a continuous, oxidation-resistant, and acid-resistant, electrically-conductive film (e.g. metal, graphitic carbon, hyperconductive polymer composite, etc.) on the surface of the composite. The continuous film will preferably be vapor deposited, sprayed or electrolessly deposited onto the composite using conventional Physical Vapor Deposition (PVD), spraying or electroless (a.k.a. autocatalytic) deposition techniques well known in the art.

The present invention also comprehends a preferred process for making a PEM fuel cell current collector comprising the steps of forming the current collector at least in part from a polymer composite material comprising a plurality of electrically conductive first particles dispersed throughout an oxidation-resistant and acid-resistant, water-insoluble polymeric matrix, and adhering a sufficient quantity of second electrically conductive particles to a surface of the composite material to provide that surface with a conductivity significantly greater (i.e. orders of magnitude greater) than that of the underlying composite material. The second particles may be applied to the composite by spraying, brushing, sifting, fluidized bed immersion or the like, and may be imbedded in the surface by impingement or simply stuck to the surface while it is in a tacky state. According to a preferred method, the current collector is made by (1) coating an electrically conductive substrate (i.e. composite or metal) with a tacky layer of uncured or undried composite material comprising a plurality of electrically conductive first particles dispersed throughout an oxidation-resistant and acid-resistant, water-insoluble polymer, (2) depositing a plurality of electrically conductive second particles onto a surface of the tacky layer to increase the conductivity of the surface over the conductivity of the remainder of the composite material, and (3) curing/drying the uncured/undried coating material. Most preferably, the second particles will be sprayed (ala sand blasting) onto the composite material with sufficient pressure to embed the particles in the uncured/undried coating material. The coating is then cured/dried to anchor the particles in place. Following curing/drying, any unbonded particles are brushed or blown from the surface. Alternatively, the surface of the polymer composite may either be heated or wetted with a solvent prior to spraying to soften the surface and render it more receptive to embedding the second particles. According to still another alternative, the surface of a dried/cured polymer composite is gently abraded (e.g. with fine sand paper) to remove any polymer skin that may have formed over the conductive filler and to smear the abraded filler over the underlying surface so as to increase its conductivity over that of the bulk of the composite material underlying the surface.

The present invention reduces the contact resistance between a composite-containing current collector and the diffusion media, which, in turn, permits the making of PEM fuel cells which require less stack compression, are smaller, are more efficient and have lower heat loads. Reducing compression alone improves stack durability, permits the use of thinner side and end plates, improves gas flow under the lands of the flow field, and provides more uniform current distribution.

BRIEF DESCRIPTION OF THE DRAWINGS

The invention will better be understood when considered in the light of the following detailed description of certain specific embodiments thereof which is given hereafter in conjunction with the several figures in which.

DESCRIPTION OF THE PREFERRED EMBODIMENT

Figure 1:
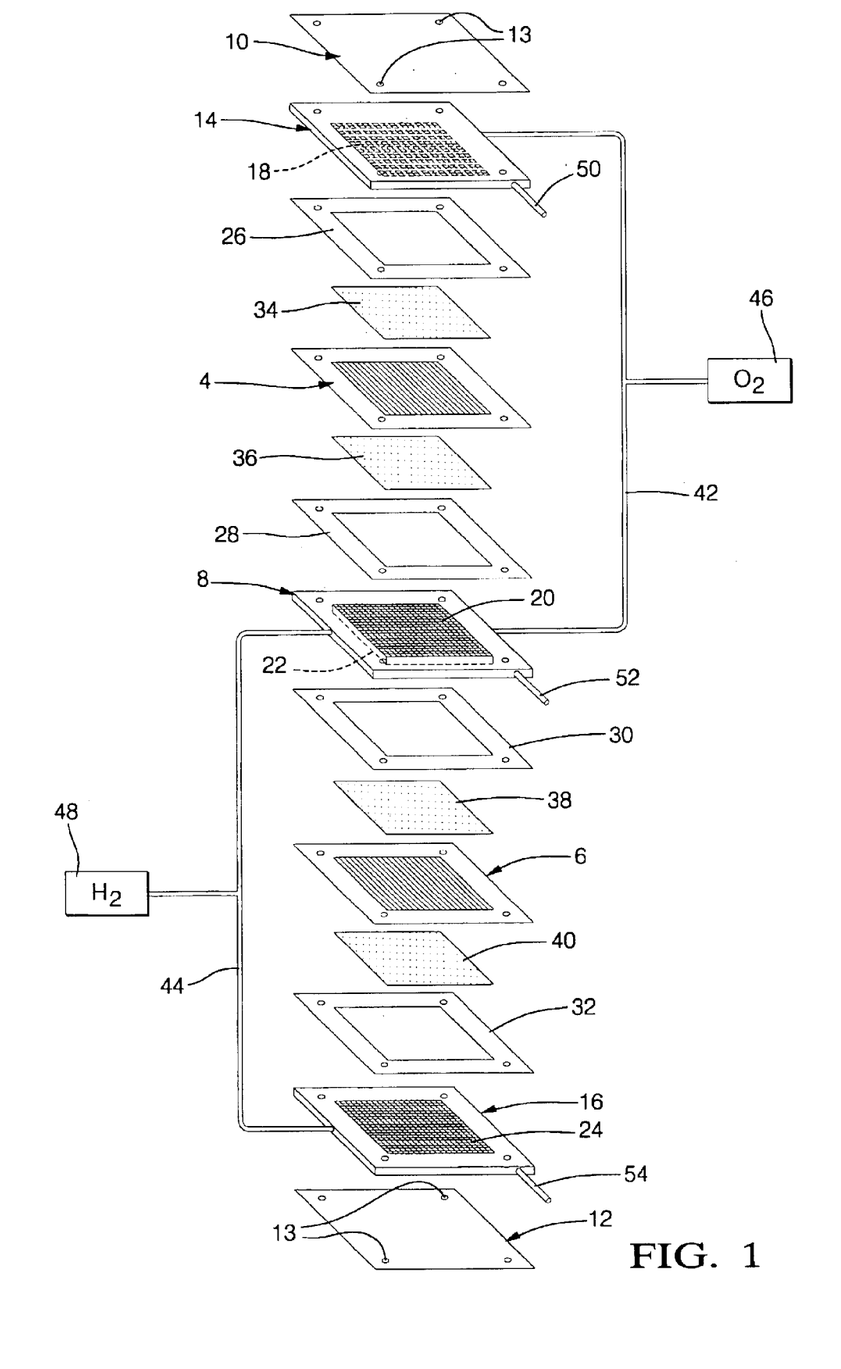
FIG. 1 is a schematic, exploded, isometric, illustration of a liquid-cooled PEM fuel cell stack (only two cells shown)

FIG. 1 depicts a two cell, bipolar PEM fuel cell stack having a pair of membrane-electrode-assemblies (MEAs) 4 and 6 separated from each other by an electrically conductive, liquid-cooled, bipolar plate 8. The MEAs 4 and 6, and bipolar plate 8, are stacked together between stainless steel clamping plates 10 and 12, and current collector end plates 14 and 16. The clamping plates 10 and 12 apply compressive force to the stack by means of bolts (not shown) that pass through openings 13 at the corners of the clamping plates 10, 12. The end plates 14 and 16, as well as both working faces of the bipolar plate 8, contain a plurality of grooves or channels 18, 20, 22, and 24 for distributing fuel and oxidant gases (i.e., $H_2$ & $O_2$) to the MEAs 4 and 6. Nonconductive gaskets 26, 28, 30, and 32 provide seals and electrical insulation between the several components of the fuel cell stack. Gas permeable carbon/graphite diffusion media 34, 36, 38 and 40 press up against the electrode faces of the MEAs 4 and 6. The end plates 14 and 16 press up against the carbon/graphite diffusion media 34 and 40 respectively, while the bipolar plate 8 presses up against the carbon/graphite media 36 on the anode face of MEA 4, and against carbon/graphite media 38 on the cathode face of MEA 6. Oxygen is supplied to the cathode side of the fuel cell stack from storage tank 46 via appropriate supply plumbing 42, while hydrogen is supplied to the anode side of the fuel cell from storage tank 48, via appropriate supply plumbing 44. Alternatively, air may be supplied to the cathode side from the ambient, and hydrogen to the anode from a methanol or gasoline reformer, or the like. Exhaust plumbing (not shown) for both the $H_2$ and $O_2$/air sides of the MEAs will also be provided. Additional plumbing 50, 52 and 54 is provided for supplying liquid coolant to the bipolar plate 8 and end plates 14 and 16. Appropriate plumbing for exhausting coolant from the plate 8 and end plates 14 and 16 is also provided, but not shown.

Figure 2:
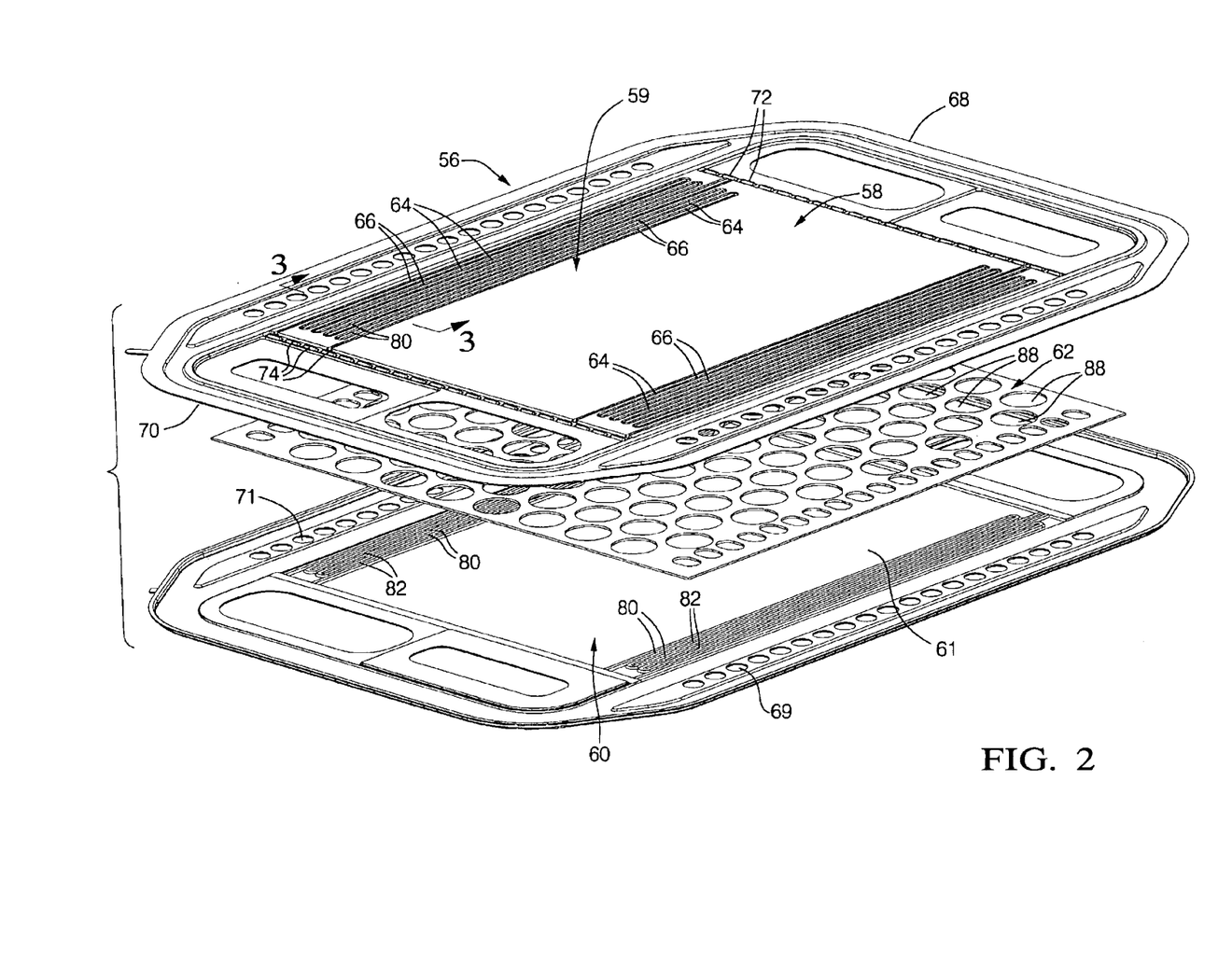
FIG. 2 is an exploded, isometric view of a bipolar plate useful with PEM fuel cell stacks like that illustrated in FIG. 1.
Figure 3:
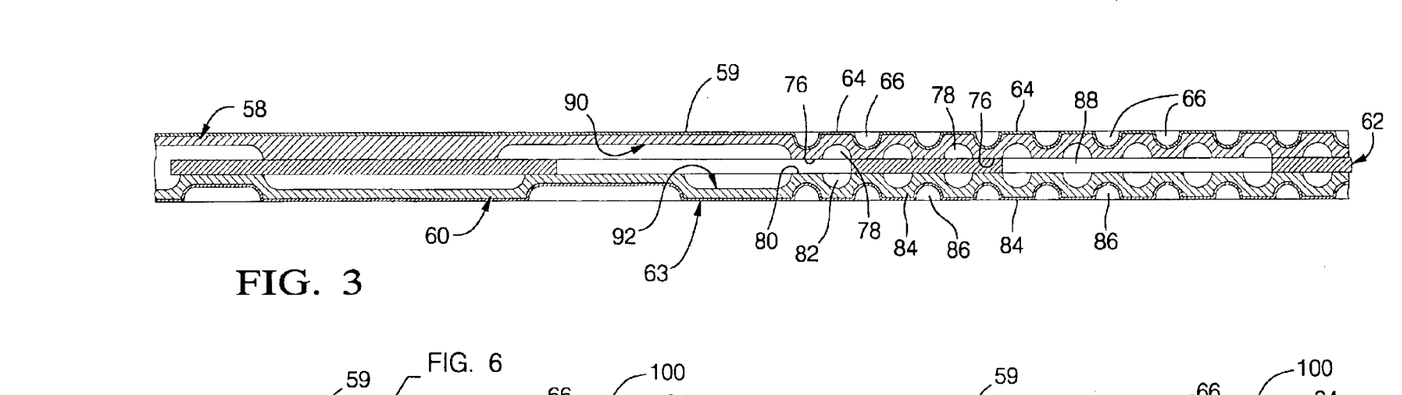
FIG. 3 is a sectioned view in the direction 3—3 of FIG. 2.

FIG. 2 is an isometric, exploded view of a bipolar plate 56 comprising a first exterior metal sheet 58, a second exterior metal sheet 60, and an interior spacer metal sheet 62 interjacent the first metal sheet 58 and the second metal sheet 60. The exterior metal sheets 58 and 60 are made as thin as possible (e.g., about 0.002–0.02 inches thick), may be formed by stamping, by photo etching (i.e., through a photolithographic mask) or any other conventional process for shaping sheet metal. The external sheet 58 has a first working face 59 on the outside thereof which confronts a membrane-electrode-assembly (not shown) and is formed so as to provide a plurality of lands 64 which define therebetween a plurality of grooves 66 known as a "flow field" through which the fuel cell's reactant gases (i.e., $H_2$ or $O_2$) flow in a tortuous path from one side 68 of the bipolar plate to the other side 70 thereof. When the fuel cell is fully assembled, the lands 64 press against the carbon/graphite media 36 or 38 (see FIG. 1), which, in turn, press against the MEAs 4, and 6 respectively. For drafting simplicity, FIG. 2 depicts only two arrays of lands and grooves. In reality, the lands and grooves will cover the entire external faces of the metal sheets 58 and 60 that engage the carbon/graphite diffusion media 36 and 38. The reactant gas is supplied to grooves 66 from a header or manifold groove 72 that lies along one side 68 of the fuel cell, and exits the grooves 66 via another header/manifold groove 74 that lies adjacent the opposite side 70 of the fuel cell. As best shown in FIG. 3, the underside of the sheet 58 includes a plurality of ridges 76 which define therebetween a plurality of channels 78 through which coolant passes during the operation of the fuel cell. As shown in FIG. 3, a coolant channel 78 underlies each land 64 while a reactant gas groove 66 underlies each ridge 76. Alternatively, the sheet 58 could be flat and the flow field formed in a separate sheet of material.

Metal sheet 60 is similar to sheet 58. The internal face 61 (i.e., coolant side) of sheet 60 is shown in FIG. 2. In this regard, there is depicted a plurality of ridges 80 defining therebetween a plurality of channels 82 through which coolant flows from one side 69 of the bipolar plate to the other 71. Like sheet 58 and as best shown in FIG. 3, the external side of the sheet 60 has a working face 63 having a plurality of lands 84 thereon defining a plurality of grooves 86 through which the reactant gases pass. An interior metal spacer sheet 62 is positioned interjacent the exterior sheets 58 and 60 and includes a plurality of apertures 88 therein to permit coolant to flow between the channels 82 in sheet 60 and the channels 78 in the sheet 58 thereby breaking laminar boundary layers and affording turbulence which enhances heat exchange with the inside faces 90 and 92 of the exterior sheets 58 and 60 respectively.

Figure 4:
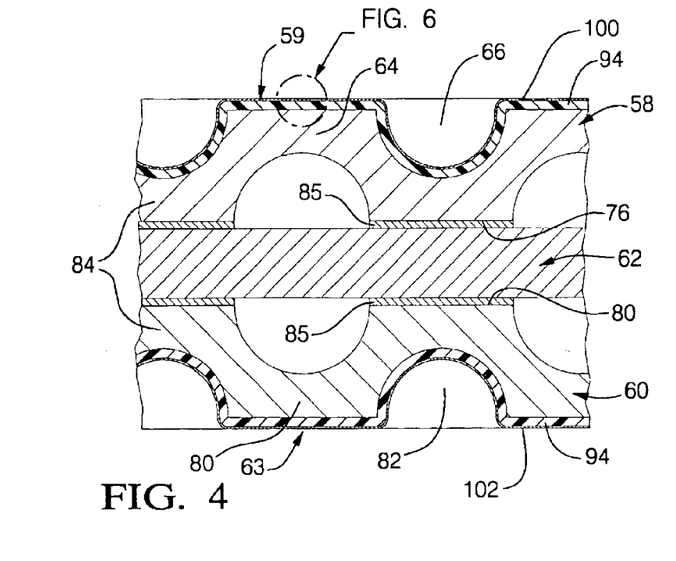
FIG. 4 is a magnified portion of the bipolar plate of FIG. 3.

FIG. 4 is a magnified view of a portion of FIG. 3 and shows the ridges 76 on the first sheet 58, and the ridges 80 on the second sheet 60 bonded (e.g. by brazement 85) to the spacer sheet 62. The working faces 59 and 63 of the bipolar plate are covered with a coating of a composite material comprising an electrically-conductive, oxidation resistant, and acid-resistant protective material 94 having a resistivity less than about 50 ohm-cm, and comprising a plurality of oxidation-resistant, acid-insoluble, conductive particles (i.e. less than about 50 microns) dispersed throughout an acid-resistant, oxidation-resistant polymer matrix. The conductive filler particles are selected from the group consisting of gold, platinum, graphite, carbon, palladium, niobium, rhodium, ruthenium, and the rare earth metals. Most preferably, the particles will comprise conductive carbon and graphite at a loading of about 25% by weight. The polymer matrix comprises any water-insoluble polymer that can be formed into a thin adherent film and that can withstand the hostile oxidative and acidic environment of the fuel cell. Hence, such polymers, as epoxies, polyamide-imides, polyether-imides, polyphenols, fluro-elastomers (e.g., polyvinylidene flouride), polyesters, phenoxy-phenolics, epoxide-phenolics, acrylics, and urethanes, inter alia are seen to be useful with the composite coating. Cross-linked polymers are preferred for producing impermeable coatings, with polyamide-imide thermosetting polymers being most preferred. To apply the polymer composite layer, the polyamide-imide is dissolved in a solvent comprising a mixture of N-methylpyrrolidone, propylene glycol and methyl ether acetate, and about 21% to about 23% by weight of a mixture of graphite and carbon black particles added thereto. The graphite particles range in size from about 5 microns to about 20 microns and the carbon black particles range in size from about 0.5 micron to about 1.5 microns. The mix is sprayed on to the substrate, dried (i.e. solvent vaporized), and cured to provide 15–30 micron thick coating (preferably about 17 microns) having a carbon-graphite content of about 38% by weight. It may be cured slowly at low temperatures (i.e. <400° F.), or more quickly in a two step process wherein the solvent is first removed by heating for ten minutes at about 300° F.–350° F. (i.e., dried) followed by higher temperature heating (500° F. –750° F.) for various times ranging from about ½ min to about 15 min (depending on the temperature used) to cure the polymer. As described hereinafter, the hyperconductive surface layer of the preferred embodiment of the invention is applied before drying and curing while the composite is still tacky.

The substrate metal 58, 60 forming the structural component of the current collector comprises a corrosion-susceptible metal such as (1) aluminum which is dissolvable by the acids formed in the cell, or (2) titanium or stainless steel which are oxidized/passivated by the formation of oxide layers on their surfaces. The conductive polymer coating may be applied directly to the substrate metal and allowed to dry/cure thereon, or the substrate metal (e.g., Al) may first be covered with an oxidizable metal (e.g., stainless steel) before the electrically conductive polymer composite layer 94 is applied (see Li et al. supra). The composite layer may be applied in a variety of ways, e.g., brushing, spraying, spreading, or laminating a preformed film onto the substrate.

Figure 5:
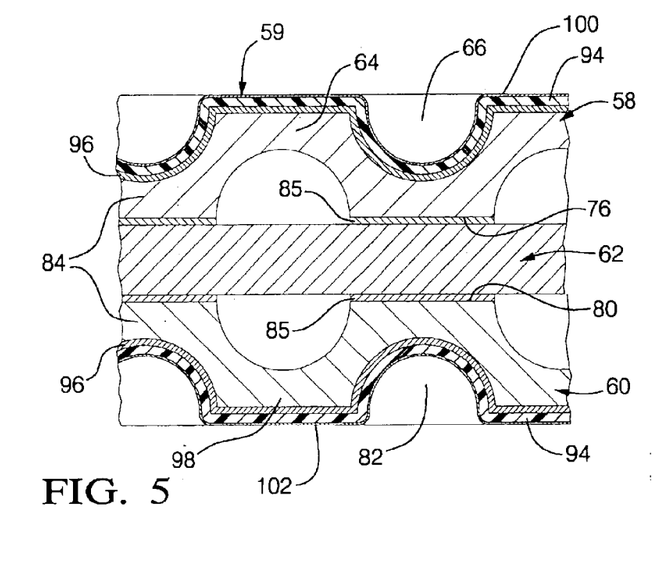
FIG. 5 is a magnified sectioned view of a bi-polar plate depicting another embodiment of the present invention.

As shown in FIG. 5, the electrically-conductive polymer composite coating 94 is applied to an acid-dissolvable substrate metal (e.g., Al) 58, 60 which had previously been coated with a layer of oxidizable/passivating metal 96. In this regard, a barrier/protective layer 96 of a metal (e.g. Ni/Cr-rich stainless steel) that forms a low resistance, passivating oxide film is first deposited onto the substrate 58, 60, and the barrier layer 96 then covered with the polymer composite layer 94.

Figure 6:
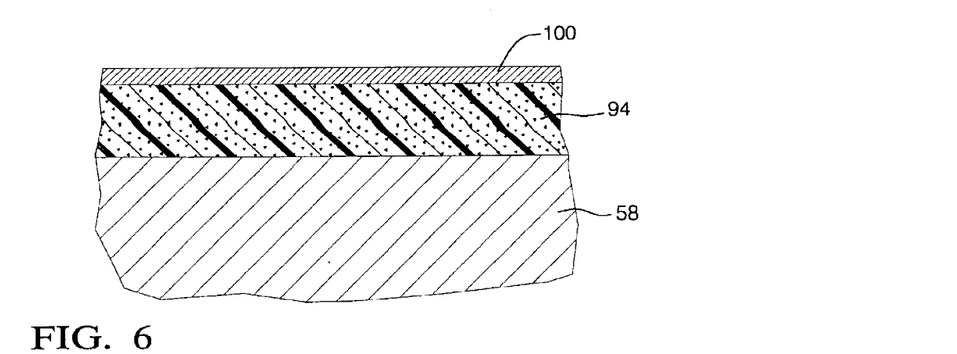
FIG. 6 is a magnified portion of FIG. 4.

In accordance with the present invention, the composite component of the current collector is provided with a hyperconductive outer surface layer that has a significantly higher electrical conductivity than the remainder of the composite material underlying the surface layer. Hence for example as shown in FIGS. 4 and 6, the bipolar plate comprises metal (e.g. stainless steel or titanium) plates 58 and 60, each coated with a composite material 94 (ala Fronk et al. supra) which, in turn, has a surface layer 100, 102 thereon that has a higher electrical conductivity than the remainder of the composite material underlying the outer layer. The surface layer 100, 102 engages the diffusion media and results in a lower contact resistance than would otherwise exist between the composite layer 94 and the diffusion media absent the more conductive surface layer. Similarly as shown in FIG. 5, corrosion-sensitive metal plates (e.g. aluminum) are first coated with a corrosion-resistant metal layer 96 (e.g. stainless steel, titanium, etc.), which, in turn, is coated with a composite layer 94 followed by the more conductive layer 100, 102 of the present invention.

Figure 7:
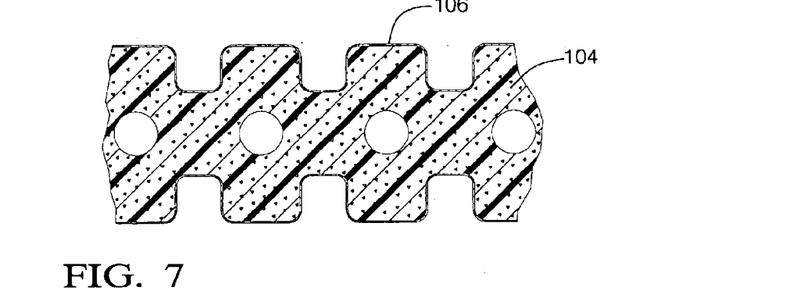
FIG. 7 is a magnified sectional view of a bipolar plate depicting another embodiment of the present invention.

FIG. 7 depicts another embodiment of the present invention wherein the body of the current collector is made (e.g. molded) entirely of composite material 104, and the more conductive surface layer 106 formed on the exterior surface of the composite that engages the diffusion media.

Figure 8:
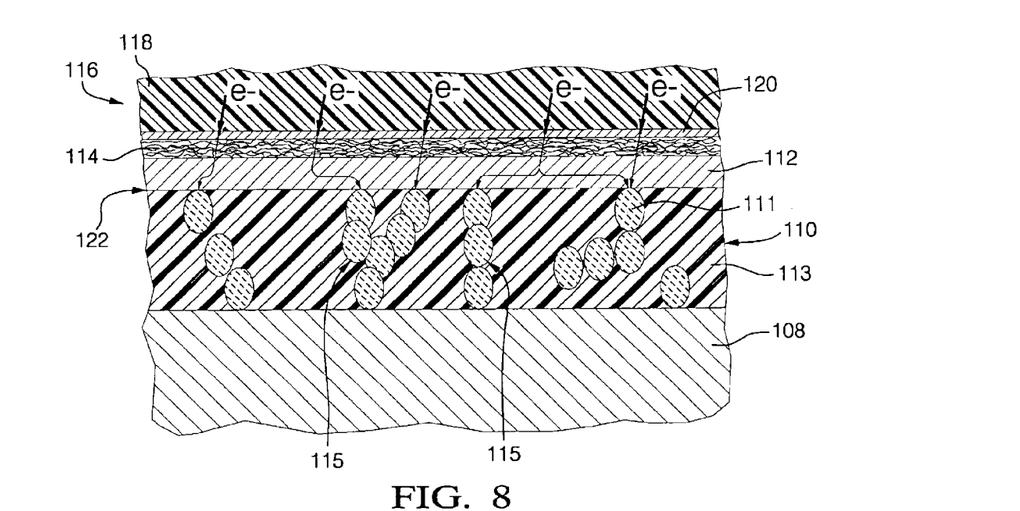
FIG. 8 is a magnified sectional view of a PEM half-cell illustrating how the invention operates.

FIG. 8 depicts how the invention works and shows a half-cell of a PEM fuel cell having a current collector like that shown in FIGS. 4 and 6. More specifically, FIG. 8 depicts an enlarged portion of a PEM fuel cell according to the present invention including a current collector comprising a metal plate 108, an electrically conductive composite coating 110 atop the metal plate 108, a hyperconductive surface layer 112 on the composite coating 110 which is more electrically conductive than the underlying composite coating 110, an electrically-conducive porous diffusion media 114 (e.g. graphite paper) engaging the hyperconductive surface layer 112 and an MEA 116 engaging the diffusion media 114. The composite layer 110 comprises a plurality of conductive particles (e.g. graphite and carbon black) 111 dispersed throughout a polymeric matrix 113. A plurality of electrically conductive bridges 115 are formed by abutting particles 111, which bridges serve to conduct current flow through the composite 110. Alternatively, the bridges 115 could comprise single filaments (e.g. graphite fibers). The MEA 116 comprises a membrane-electrolyte 118, and a layer of catalyst 120 forming an electrode on the surface of the MEA 116. In operation, electrons pass from the electrode 120 into the diffusion media 114 and thence to the hyperconductive layer 112. The electrons readily move laterally through the hyperconductive layer 112 until a conductive bridge 115 is encountered that allows current to flow through the composite 110. Hence, the hyperconductive layer112 essentially shunts the current from the more resistive areas of the interface 122 between the composite 110 and the hyperconductive layer112 to the more conductive areas of that interface (i.e. where conductive particles 111 reside).

The second particles of the hyperconductive layer of the present invention may be applied to the composite in a number of ways. According to a preferred method, the composite material is sprayed onto a conductive substrate (i.e. metal or all polymer composite) as a mixture of first conductive particles (e.g. graphite), polymer and solvent for the polymer. Spraying leaves a tacky composite coating on the substrate. Dry second conductive particles (e.g. graphite) are then sprayed or otherwise applied onto the tacky composite coating and stick thereto. At low (i.e. <about 10 psi) spray pressures, the second conductive particles simply stick to the surface of the composite, whereas at higher (>about 40 psi) spray pressures the second particles become more deeply embedded in the surface of the composite. Following deposition of the second particles, the composite is dried and/or cured by heating. Curing/drying time and temperature will vary with the composition of the polymer matrix. Alternatively, the second particles may be applied to the composite by brushing, sifting, fluidized bed or similar techniques. In the case of metal substrates, it may be desirable to deposit at least two layers of composite before applying the more-conductive top layer in order to provide extra corrosion protection for the metal substrate. When two composite layers are used, the first layer may be sprayed on and dried as described above. It may or may not be cured before applying the second composite layer. The hyperconductive layer of the present invention is applied to the second composite layer in the same manner as described above. When the current collector is made (e.g molded) entirely from composite material, the second conductive particles of the hyperconductive layer of the present invention may be applied directly to the surface of the composite material, or the surface of the composite material may be coated with a separate composite layer as described above. In the former case, it is desirable to soften the surface of the composite to make it more receptive to receiving and retaining the second conductive particles. Softening may be effected by wiping/spraying the surface with a suitable solvent, or by heating the surface. The second conductive particles are applied to the composite surface while it is still soft, followed by drying or cooling, as needed, to anchor the second particles in place. Following curing, drying or cooling, which ever is used, loose unbonded second conductive particles are blown or brushed from the surface.

Mildly abrading the surface of a dried/cured composite material will also make the surface of the composite more conductive (i.e. hyperconductive) than the underlying composite. Hence, an alternative technique for making a current collector according to the present invention is to make it at least in part from a composite material, and then lightly sanding it with a fine abrasive to remove any polymer skin that might be covering the filler at the surface, and to smear the filler in the abraded layer over the underlying surface and thereby enhance its conductivity. For example with composites comprising about 30% of a mixture of graphite and carbon black, lightly sanding with 0000 grit SiC sand paper until the surface color changes from black to grey has been found to be highly effective in rendering the surface hyperconductive relative to the underlying polymer composite material The hyperconductive surface layer of the present invention may alternatively comprise a thin continuous film of conductive material deposited on the surface of the composite. By continuous is meant a film that can be peeled off as a unit as distinquished from a plethora of discrete particles that touch each other, but are not integral with each other. The films may have the same chemical composition as the second particles identified above, but are plated onto the composite by well known electroplating, electroless plating, PVD (physical vapor deposition) or sputtering techniques. In this regard, gold, ruthenium, palladium, rhodium and platinum can be readily electroplated onto the composite surface, and gold, palladium and platinum readily electrolessly plated on to the composite surface. PVD or sputtering can be used to deposit all of the conductive materials identified above as comprising the hyperconductive surface layer. In the electroplating process, the composite is made the cathode in an electroplating cell having an electrolyte containing a salt of the metal being deposited. When electrical current passes through the cell at an appropriate potential, the desired metal deposits out on the surface of the cathodic composite. In the electroless (i.e. autocatalytic) process the surface of the composite is seeded with a catalyst and then exposed to a bath containing ions of the metal to be deposited. The catalyst initiates reduction of the metal ions to elemental metal, which forms a metal film on the surface of the substrate. In the PVD and sputtering processes, the material to be plated condenses on the substrate from a vapor thereof. The continuous hyperconductive film may also comprise a layer of hyperconductive polymer composite material having a higher filler loading (e.g. >90%) than the underlying composite substrate. Such highly loaded polymer composites may be rolled, brushed, doctor-bladed, or sprayed onto the substrate.

Figure 9:
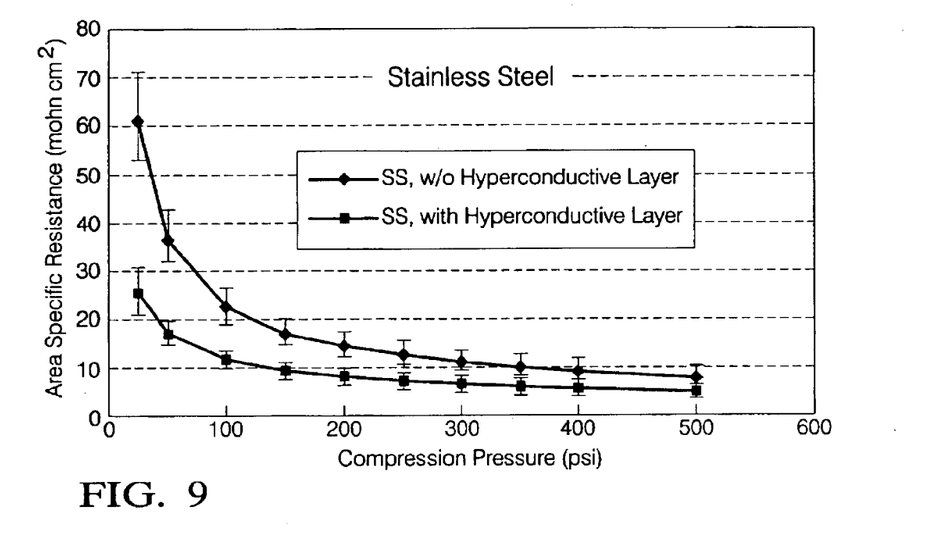
FIGS. 9 and 10 are graphs comparing the contact resistances for composite-coated stainless steel and titanium plates with and without the more conductive surface layer of the present invention.
Figure 10:
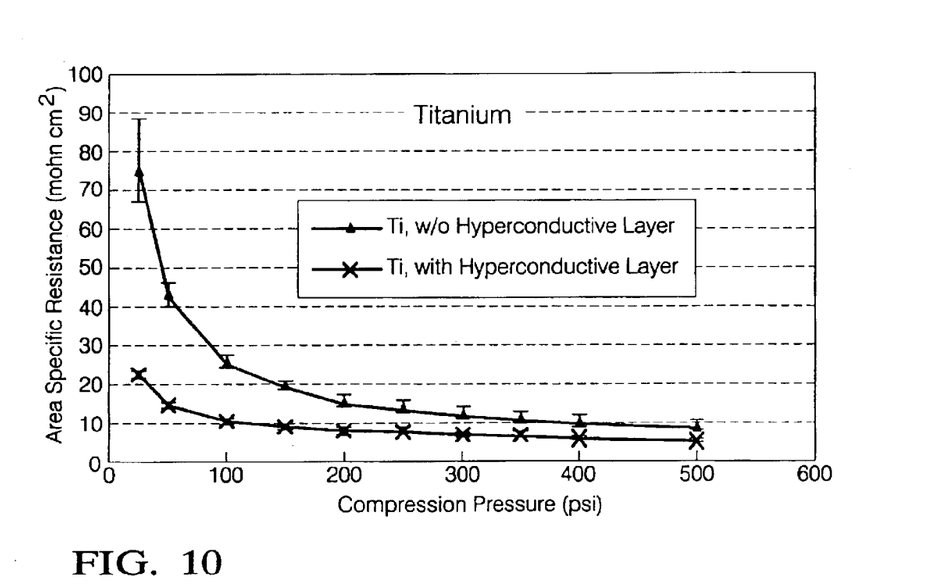

FIGS. 9 and 10 are graphs showing the reduced contact resistances achievable by the present invention with stainless steel and titanium substrates respectively. The titanium samples were polished with an abrasive pad to remove any insulating oxides thereon. The stainless steel samples were cathodically cleaned at 5–50 mA/cm$^2$ for 5 to 30 minutes in a 0.1 to 1.0 molar sulfuric acid solution to reduce the oxide thickness. The thusly polished/cleaned samples were spray coated with a first layer of composite material comprising about 30% by volume graphite and carbon black particles dispersed throughout a polyamide-imide polymer matrix. The coated samples were flash dried at 150° C. for 10 minutes to remove the solvent and solidify the coating. Without curing, the sample was coated a second time with the same composite material followed by spraying a hyperconductive layer of graphite flakes atop the second composite coating. The samples were then dried by flashing the solvent off at 150° C. for 10 minutes followed by curing the first and second composite coatings at 260° C. for 15 minutes. Loose, unbonded graphite particles were blown from the surface. The samples were then mated to diffusion media provided by the Toray Company and identified as TGP-H-1.0T, and subjected to contact resistance tests. Control samples were made from the same stainless steel and titanium metals and coated with the same two layers of composite materials, but were not provided with a hyperconductive surface layer of graphite flakes. The results of those comparative tests are shown in FIGS. 9 (stainless steel) and 10 (titanium). Both figures show that the contact resistances for five samples prepared according to the present invention (i.e. with the hyperconductive layer) were significantly lower than the contact resistances for five control samples over a wide range pressures applied to the samples and diffusion media. Other tests demonstrated the stability of the hyperconductive layer in that the contact resistance of samples made in accordance with the present invention, as set forth above, did not increase during corrosion testing in a fuel cell-like environment.

While the invention has been described in terms of specific embodiments thereof it is not intended to be limited thereto but rather only to the extent set forth hereafter in the claims, which follow.

What is claimed is:

1. In a Proton Exchange Membrane fuel cell having at least one cell comprising (a) a pair of opposite polarity electrodes each having a first face exposed to a fuel cell reactant and a second face engaging a membrane-electrolyte interjacent said electrodes, (b) a porous, electrically-conductive media engaging said first face for distributing said reactant over, end conducting electrical current from, said first face, and (3) a current collector engaging said media for conducting electrical current from said media said current collector comprising a composite having a first conductivity and comprising corrosion-proof, electrically conductive filler dispersed throughout an oxidation-resistant and acid-resistant, water-insoluble polymeric matrix, the improvement comprising said current collector comprising a metal substrate supporting said composite and an oxidation-resistant and acid-resistant hyperconductive surface layer on said composite and engaging said media, said hyperconductive surface layer having a second conductivity greater than said first conductivity and serving to shunt electrical current passing through said media into said surface layer to such of said filler in said composite as resides at the interface between said surface layer and said composite, and thereby reduce the contact resistance that would otherwise exist between said composite and said media absent said surface layer.

2. A fuel cell according to claim 1 wherein said substrate comprises a first acid-soluble metal underlying a second acid-insoluble, oxidizeable metal layer engaging said composite.

3. A fuel cell according to claim 1 wherein said metal is selected from the group consisting of titanium, stainless steel, and aluminum.

4. In a Proton Exchange Membrane fuel cell having at least one cell comprising (a) a pair of opposite polarity electrodes each having a first face exposed to a fuel cell reactant and a second face engaging a membrane-electrolyte interjacent said electrodes, (b) a porous, electrically-conductive media engaging said first face for distributing said reactant over, and conducting electrical current from, said first face, and (3) a current collector engaging said media for conducting electrical current from said media, said current collector comprising a composite having a first conductivity and comprising corrosion-proof, electrically conductive filler dispersed throughout an oxidation-resistant and acid-resistant, water-insoluble polymeric matrix, the improvement comprising an oxidation-resistant and acid-resistant hyperconductive surface layer on said composite and engaging said media, said hyperconductive surface layer comprising a plurality of oxidation-resistant and acid-resistant, electrically-conductive particles adhering to a surface of said composite confronting said media and having a second conductivity greater than said first conductivity to shunt electrical current passing through said media into said surface layer to such of said filler in said composite as resides at the interface between said surface layer and said composite, and thereby reduce the contact resistance that would otherwise exist between said composite and said media absent said surface layer.

5. A fuel cell according to claim 4 wherein said filler is selected from the group consisting of gold, platinum, graphite, conductive carbon, palladium, rhodium, ruthenium, and the rare earth metals.

6. A fuel cell according to claim 4 wherein said filler comprises a plurality of particles.

7. A fuel cell according to claim 6 wherein said particles are fibrillose and oriented in the general direction that the electrical current flows through the composite.

8. A fuel cell according to claim 4 wherein said current collector is comprised entirely of said composite.

9. A fuel cell according to claim 4 wherein said filler comprises continuous fibers that extend through the thickness of said composite.

10. A fuel cell according to claim 4 wherein at least one of said current collectors is a bipolar plate confronting the anode of one said cells and the cathode of the next adjacent cell.

11. A fuel cell according to claim 4 wherein said polymer matrix is selected from the group consisting of epoxies, polyamide-imides, polyether-imides, polyphenols, fluroelastomers, polyesters, phenoxy-phenolics, epoxide-phenolics, acrylics, and urethanes.

12. A proton exchange membrane fuel cell according to claim 4 wherein said particles comprise graphite.

13. A proton exchange membrane fuel cell according to claim 4 wherein said particles are at least partially embedded in said surface.

14. In a Proton Exchange Membrane fuel cell having at least one cell comprising (a) a pair of opposite polarity electrodes each having a first face exposed to a fuel cell reactant and a second face engaging a membrane-electrolyte interjacent said electrodes, (b) a porous, electrically-conductive media engaging said first face for distributing said reactant over, and conducting electrical current from, said first face, and (3) a current collector engaging said media for conducting electrical current from said media said current collector comprising a composite having a first conductivity and comprising corrosion-proof, electrically conductive filler dispersed throughout an oxidation-resistant and acid-resistant, water-insoluble polymeric matrix, the improvement comprising an oxidation-resistant and acid-resistant hyperconductive surface layer on said current collector and engaging said media, said hyperconductive surface layer comprising a continuous, oxidation-resistant, and acid-resistant film on the surface of said composite confronting said media and having a second conductivity greater than said first conductivity to shunt electrical current passing through said media into said surface layer to such of said filler in said composite as resides at the interface between said surface layer and said composite, and thereby reduce the contact resistance that would otherwise exist between said composite and said media absent said surface layer.

* * * * *